(12) United States Patent
Chang et al.

(10) Patent No.: US 7,697,938 B2
(45) Date of Patent: Apr. 13, 2010

(54) FUZZY LOGIC SCHEDULER FOR RADIO RESOURCE MANAGEMENT

(75) Inventors: Jiang Chang, Beijing (CN); Jun Qiang Liu, Beijing (CN); Wen Tao Zhang, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 803 days.

(21) Appl. No.: 11/456,599

(22) Filed: Jul. 11, 2006

(65) Prior Publication Data

US 2007/0177500 A1 Aug. 2, 2007

(30) Foreign Application Priority Data

Jan. 27, 2006 (CN) .................. 2006 1 0084176

(51) Int. Cl.
*H04W 72/00* (2009.01)
(52) U.S. Cl. ............... 455/450; 455/451; 455/452.1; 455/452.2; 455/422.1; 455/464; 370/329; 370/431; 370/341
(58) Field of Classification Search ......... 455/450, 455/451, 452.1, 452.2, 453, 422.1, 509, 464; 370/341, 236.1, 395.41, 329, 431
See application file for complete search history.

(56) References Cited

U.S. PATENT DOCUMENTS

| | | | | |
|---|---|---|---|---|
| 6,374,197 B1 * | 4/2002 | Ganesh et al. | ............... | 702/191 |
| 6,402,694 B1 * | 6/2002 | Bae et al. | ............... | 600/453 |
| 6,424,957 B1 * | 7/2002 | Matranga et al. | ............... | 706/8 |
| 6,477,520 B1 * | 11/2002 | Malaviya et al. | ............... | 706/47 |
| 6,526,008 B1 * | 2/2003 | Caponetto et al. | ............... | 369/44.35 |
| 6,792,275 B1 * | 9/2004 | Lo et al. | ............... | 455/452.2 |
| 7,065,042 B1 * | 6/2006 | Pan et al. | ............... | 370/229 |
| 7,444,316 B1 * | 10/2008 | Vengerov | ............... | 706/52 |
| 2004/0210903 A1 * | 10/2004 | Kosanovic et al. | ............... | 718/105 |
| 2004/0233868 A1 * | 11/2004 | Farnham | ............... | 370/329 |
| 2005/0025090 A1 * | 2/2005 | Klein et al. | ............... | 370/328 |
| 2005/0063422 A1 * | 3/2005 | Lazar et al. | ............... | 370/532 |
| 2005/0065753 A1 * | 3/2005 | Bigus et al. | ............... | 702/186 |
| 2005/0091657 A1 * | 4/2005 | Priem | ............... | 718/104 |
| 2005/0215285 A1 * | 9/2005 | Lin | ............... | 455/557 |
| 2005/0260997 A1 * | 11/2005 | Korale et al. | ............... | 455/452.2 |
| 2007/0142067 A1 * | 6/2007 | Cheng et al. | ............... | 455/512 |
| 2008/0167049 A1 * | 7/2008 | Karr et al. | ............... | 455/456.2 |

\* cited by examiner

*Primary Examiner*—Duc Nguyen
*Assistant Examiner*—Dominic E Rego
(74) *Attorney, Agent, or Firm*—Williams, Morgan & Amerson, PC

(57) ABSTRACT

The present invention provides a method of radio resource allocation. The method comprises associating a plurality of mobile units with a corresponding plurality of scheduling states based on at least one radio resource parameter and at least one rule, associating each mobile unit with one allocation state based on the plurality of scheduling states associated with the mobile units, and allocating radio resource to at least one mobile units based on the allocation states.

14 Claims, 5 Drawing Sheets

FUZZY LOGIC SCHEDULER FOR RADIO RESOURCE MANAGEMENT

CROSS REFERENCE TO RELATED APPLICATIONS

This patent application claims priority to the previously filed Chinese Application No. 200610084176.5 which was filed with the Chinese Patent Office on Jan. 27, 2006.

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as node-Bs or Access Network (AN), for providing wireless connectivity to one or more mobile units, which may also be referred to using terms such as user equipment, subscriber equipment, and Access Terminals (AT). Exemplary mobile units include cellular telephones, personal data assistants, smart phones, text messaging devices, laptop computers, desktop computers, and the like. A base station may provide wireless connectivity concurrently to one or more mobile units, such as the mobile units in a geographical area, or cell, associated with the base station. Each base station has a limited budget of radio resources that may be used to provide a wireless connectivity. Exemplary radio resources include total transmission power, available channel codes, time slots, modulation/coding sets, and the like.

Base stations typically include a radio resource management mechanism, such as a scheduler, which is used to allocate radio resources to the mobile units. Conventional radio resource management mechanisms may implement either efficiency-driven algorithms (e.g., a maximum rate scheduler) or fairness-driven algorithms (e.g., a round-robin scheduler). The efficiency-driven algorithms attempt to achieve the highest efficiency of radio resource usage, e.g., by allocating more radio resources to the mobile units that are able to support transmissions at the highest data rates. However, efficiency driven algorithms typically sacrifice fairness because mobile units that are unable to support high data transfer rates may not be allocated radio resources. Fairness-driven algorithms attempt to allocate the radio resources fairly, e.g., by allocating resources sequentially to each mobile unit having a wireless connection with the base station. However, fairness-driven algorithms methods may sacrifice efficiency because the base station may allocate radio resources to mobile units that have comparatively poor quality connections to the base station.

Conventional schedulers use mathematical models to allocate resources to mobile units. However, each base station is typically required to provide service to many mobile units and each mobile unit may have different (and potentially time variable) intra-user quality of service (QoS) requirements and inter-user quality of service requirements. These requirements may be difficult or impossible to model using mathematical formulae. Moreover, different application scenarios that may be implemented on the base station and/or the mobile unit may have different resource allocation requirements. Accommodating these application-dependent requirements may be difficult or impossible using current methods that implement a single mathematical model in the scheduling algorithm. What is more, resource scheduling policies or schemes from operators may dynamically adjust due to fast changing market motivations. Consequently, radio resource allocation algorithms based on mathematical models may sacrifice accuracy and/or flexibility, which may degrade the effectiveness and functionality of the radio resource allocation algorithms when applied to complex systems that may have time-variant requirements.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for radio resource allocation. The method comprises associating a plurality of mobile units with a corresponding plurality of scheduling states based on at least one radio resource parameter and at least one rule, associating each mobile unit with one allocation state based on the plurality of scheduling states associated with the mobile units, and allocating radio resource to at least one mobile units based on the allocation states.

BRIEF DESCRIPTION OF THE DRAWINGS

The invention may be understood by reference to the following description taken in conjunction with the accompanying drawings, in which like reference numerals identify like elements, and in which.

Figure 1:
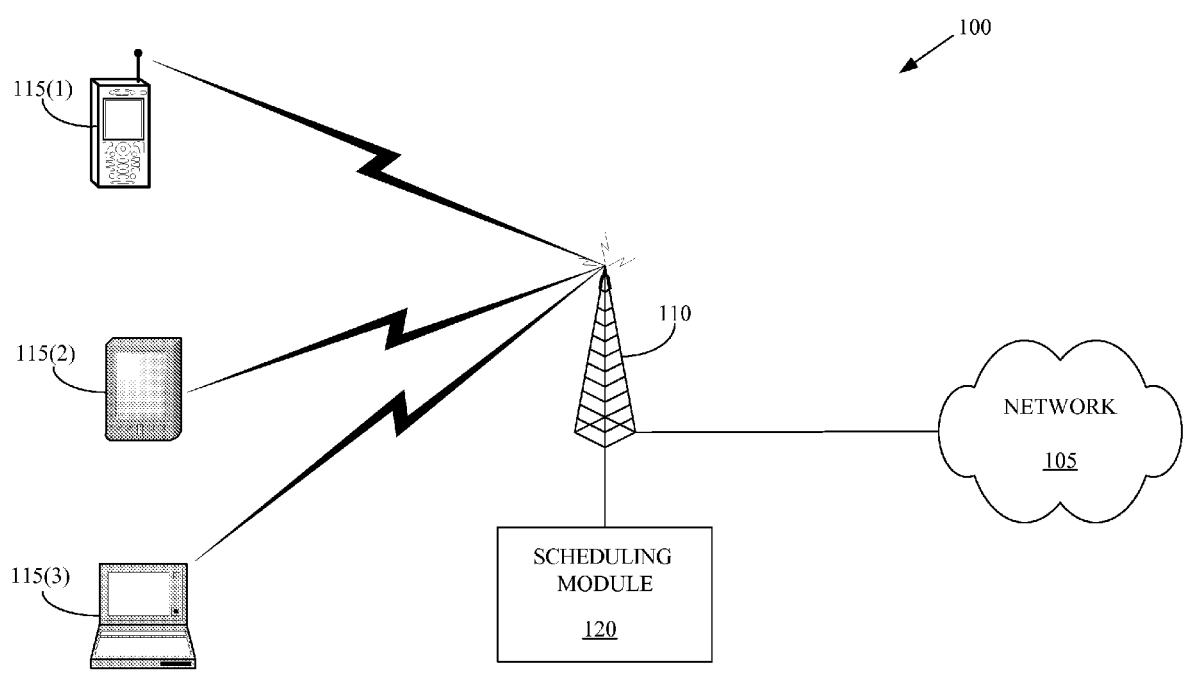
FIG. 1 conceptually illustrates one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 is a wireless communication system that may provide wireless connectivity according to one or more wireless communication protocols. Exemplary wireless communication protocols may include, but are not limited to, protocols defined in accordance with the Universal Mobile Telecommunication System (UMTS), protocols defined in accordance with the Global System for Mobile communications (GSM), Code Division Multiple Access (CDMA, CDMA 2000) protocols, Bluetooth protocols, one or more of the IEEE 802 protocols, and the like. The communication system 100 may also include wired portions and so the communication system 100 may also operate in accordance with one or more wired communication protocols.

The communication system 100 includes a network 105. In various embodiments, the network 105 may include public and/or private portions, wired and/or wireless portions, packet-switched portions, circuit-switched portions, and the like. Exemplary networks that may constitute a portion of the network 105 include, but are not limited to, an Internet, one or more intranets, a Public Switched Telephone Network (PSTN), a Public Land Mobile Network (PLMN), a Plain Old Telephone System (POTS), UMTS networks, GSM networks, CDMA networks and the like. The network 105 may also include one or more end-user devices such as land-line telephones, cellular telephones, personal data assistants, smart phones, network interface cards, notebook computers, desktop computers, and the like.

One or more base stations 110 may be used to provide wireless connectivity to one or more associated geographic areas or cells. Although a single base station 110 is shown in FIG. 1, persons of ordinary skill in the art having benefit of the present disclosure should appreciate that the present invention is not limited to communication systems 100 including a single base station 110. In alternative embodiments, any number of base stations 110 may be deployed in the communication system 100. Persons of ordinary skill in the art having benefit of the present disclosure should also appreciate that other types of node-Bs or access networks may be used to provide wireless connectivity in the communication system 100. For example, one or more base station routers (not shown) may be used to provide the wireless connectivity.

In the illustrated embodiment, the base station 110 provides wireless connectivity to mobile units 115(1-3). The indices (1-3) may be used when referring to the mobile units 115(1-3) individually or to subsets of the mobile units 115(1-3). However, the indices (1-3) may be dropped when referring to the mobile units 115 collectively. This convention may also be used for other elements described herein. Exemplary mobile units 115 may include cellular telephones 115(1), personal data assistants 115(2), and notebook computers 115(3). However, the mobile units 115 are not limited to the exemplary mobile units 115 shown in FIG. 1. In alternative embodiments, the mobile units 115 may include other devices such as smart phones, text messaging devices, paging devices, network interface cards, desktop computers, and the like.

The base station 110 includes a scheduling module 120. For ease of illustration, the scheduling module 120 is depicted in FIG. 1 as an entity distinct from the base station 110.

However, persons of ordinary skill having benefit of the present disclosure should appreciate that this is not necessary to the practice of the present invention. In various alternative embodiments, the scheduling module 120 may be implemented as a portion of the base station 110 or as a separate entity. Persons of ordinary skill in the art having benefit of the present disclosure should also appreciate that the scheduling module 120 may be implemented in hardware, firmware, software, or any combination thereof.

The scheduling module 120 may allocate resources to one or more of the mobile units 115 based on considerations of efficiency, fairness, and/or other quality of service requirements that may be associated with the mobile units 115 and/or specific applications implemented on the mobile units 115. In one embodiment, as will be discussed in detail below, the scheduling module 120 allocates resources to one or more of the mobile units 115 using fuzzy logic techniques. Persons of ordinary skill in the art having benefit of the present disclosure should appreciate that the term "fuzzy logic" refers to techniques for processing data by allowing partial set membership rather than crisp set membership or non-membership. Fuzzy logic provides a simple way to arrive at a definite conclusion based upon vague, ambiguous, imprecise, noisy, or missing input information by implementing a rule-based IF X AND Y THEN Z approach to a solving control problems rather than attempting to model a system mathematically. The fuzzy logic approach is empirically-based, relying on an operator's experience rather than their technical understanding of the system. Fuzzy logic typically uses one or more fuzzy rules to determine membership in one or more fuzzy sets, as will be discussed in more detail below. The fuzzy rules and/or the fuzzy sets may be determined (or modified) using existing (or newly determined) expert knowledge, e.g., expert knowledge of the communication system 100.

The scheduling module 120 allocates radio resources to one or more of the mobile units 115 based on at least one radio resource parameter. As used herein, the term "radio resource parameter" will be understood to refer to parameters that are indicative of the radio resource that may be available to (or allocated to) the mobile unit 115. For example, radio resource parameters may include transmission powers that may be allocated to the mobile unit 115, a number of channel codes that may be allocated to the mobile unit 115, a number of time slots that may be allocated to the mobile unit 115, a modulation/coding set that may be used by the mobile unit 115 and/or the base station 110 to modulate/demodulate and/or encode/decode information. The term "radio resource parameter" may also refer to parameters that may be considered in allocating one or more of the radio resources. In one embodiment, radio resource parameters include one or more quality of service (QoS) parameters associated with the mobile unit. For example, the radio resource parameters may include a traffic class (e.g., conversational, interactive, streaming, and/or background), a peak transmission rate, a maximum latency, a maximum packet loss rate, a delay sensitivity, an end-to-end delay, and the like. The quality of service parameters may also include inter-user quality of service parameters such as Gold1, Gold2, Gold Mg, Silver1, Silver2, Bronze1, Bronze2, Bronze Mb, and the like. The quality of service parameters may further include intra-user quality of service parameters such as parameters that indicate whether the service is rate sensitive (so that assured forwarding is required or desired), delay sensitive (so that expedited forwarding is required or desired), or whether best effort forwarding is acceptable.

In one embodiment, the scheduling module 120 associates the mobile units 115 with a scheduling state based on one or more rules associated with the scheduling state and one or more radio resource parameters. As used herein, the term "scheduling state" refers to a condition, status, mode, category, set, or other term that may be determined by applying one or more rules to one or more radio resource parameters associated with the mobile units 115. For example, the scheduling states may be fuzzy sets and the scheduling module 120 may assign the mobile units 115 to one or more of the fuzzy sets based on one or more fuzzy rules associated with the fuzzy sets. Exemplary scheduling states may include an ACTIVE state (which may indicate that a user's request receives a high priority for resource allocation), a DORMANT state (which may indicate that a user's request receives a middle priority for resource allocation), and a NULL state (which may indicate that a user's request receives a low priority for resource allocation).

The scheduling module 120 may then associate the mobile unit 115 with at least one allocation state based on the scheduling state associated with the mobile unit 115. As used herein, the term "allocation state" refers to a condition, status, mode, category, set, or other term that may be indicative of a likelihood that one or more radio resource parameters may be allocated to the associated mobile unit 115. For example, the scheduling module 120 may associate the mobile units 115 with one or more allocation states based on the one or more fuzzy sets initially associated with the mobile unit 115. Exemplary allocation states may include $S_{allocation}$ (likely to grant portion of available resources to mobile unit 115), $S_{waiting}$ (may grant portion of available resources to mobile unit 115 at a later time or competition round), and $S_{reject}$ (unlikely to grant portion of available resources to mobile unit 115). Thus, the scheduling state may be an interim state and the allocation state may be a final state that is determined based on the interim state, as will be discussed in detail below. The scheduling module 120 may then allocate radio resource to at least one mobile unit 115 based on the allocation state.

Figure 2:
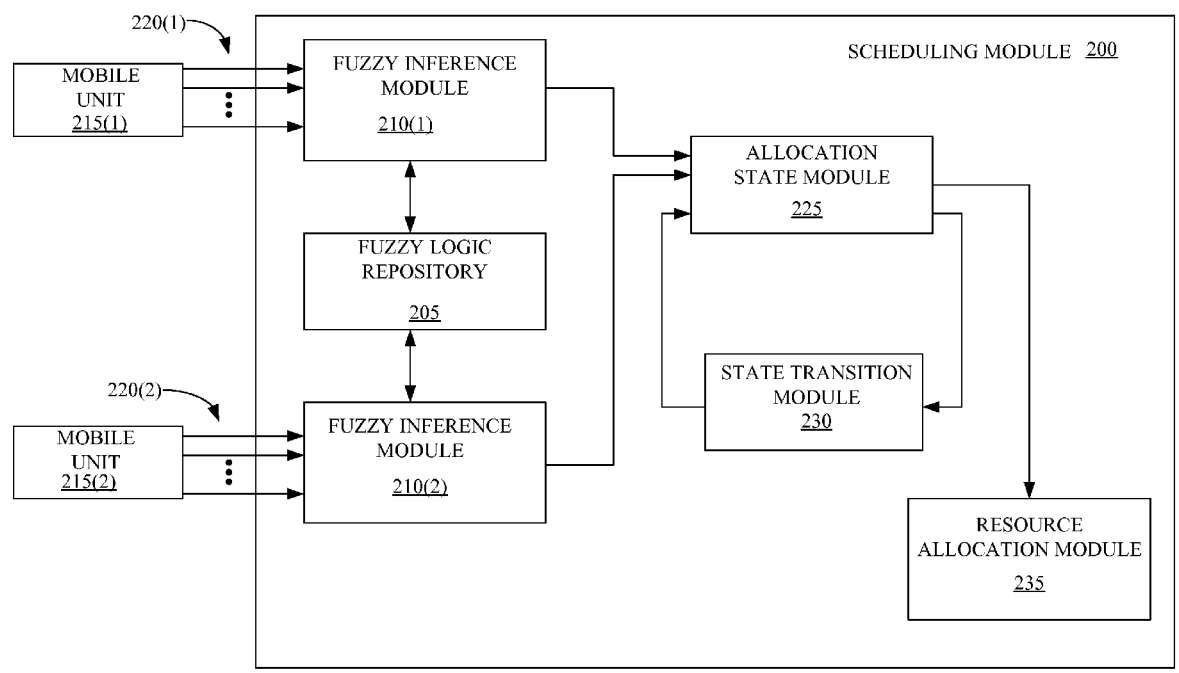
FIG. 2 conceptually illustrates one exemplary embodiment of a scheduling module that may be used in the communication system shown in FIG. 1, in accordance with the present invention.

FIG. 2 conceptually illustrates one exemplary embodiment of a scheduling module 200 that may be used in the communication system 100 shown in FIG. 1. In the illustrated embodiment, the scheduling module 200 includes a fuzzy logic repository 205 that may be used to store one or more fuzzy rules. For example, the fuzzy logic repository 205 may be used to store a set of fuzzy rules with the form:

Rule: if $x_1$ is in $F_1$ and if $x_2$ is in $F_2$, . . . , and $x_n$ is in $F_n$, then y is in G where $F_i$ and G are the fuzzy sets, $x_i$ are input variables, and y is an output variable. The rules stored in the fuzzy logic repository 205 may be determined based on existing expert knowledge regarding the communication system. In one embodiment, the rules may be determined so that resources are allocated based on considerations of efficiency, fairness, and/or quality of service requirements. For example, one rule that may be stored in the fuzzy logic repository 205 may be:

Rule (i): if (Required Power) is LARGE and (Delay Sensitivity) is STRICT and (Serving Priority) is SILVER2 and (Time Duration) is LONG and (Needed Channel Codes) is HUGE, then (User State) is DORMANT.

However, persons of ordinary skill in the art having benefit of the present disclosure should appreciate that the precise form of the rules stored in the fuzzy logic repository 205 is a matter of design choice. Furthermore, the rules stored in the fuzzy logic repository 205 may be different for different applications resident on the mobile units 215, and the rules may be periodically modified and/or time variant.

The scheduling module 200 also includes one or more fuzzy inference modules 210. The fuzzy inference modules 210 may be implemented in hardware, firmware, software, or any combination thereof. Two fuzzy inference modules 210 are shown in FIG. 2. However, persons of ordinary skill in the art should appreciate that any number of fuzzy inference modules 210 may be implemented in the scheduling module 200. Furthermore, persons of ordinary skill in the art having benefit of the present disclosure should also appreciate that the fuzzy inference modules 210 may be separate instances (or threads) of a single hardware, firmware, and/or software module.

The fuzzy inference modules 210 may receive the radio resource parameters from the mobile units 215, as indicated by arrows 220. However, persons of ordinary skill in the art should appreciate that the fuzzy inference modules 210 may access the radio resource parameters from any location, including one or more memory elements and/or registers. The fuzzy inference modules 210 may then determine the membership values of the fuzzy sets associated with the accessed radio resource parameters. For example, the radio resource parameters associated with the mobile unit 215(1) may indicate that the required power is 15 dBm, the delay sensitivity is 2 ms, the serving priority is 3, the time duration is 20 ms, and the requested number of channel codes is 3. The fuzzy inference module 210(1) may use these radio resource parameters to determine that the membership value of the "Required Power" for LARGE is 0.8, the "Delay Sensitivity" for MODERATE is 0.2, the "Serving Priority" for MEDIUM is 0.4, the "Time Duration" for SHORT is 0.1, and the "Requested Number of Channel Codes" for SMALL is 0.3.

The fuzzy inference modules 210 may determine one or more indicative values for the scheduling states associated with mobile units 215 based on the determined membership values for the fuzzy sets and one or more rules, which may be retrieved from the fuzzy logic repository 205. In one embodiment, the fuzzy inference modules 210 determine the indicative values of the scheduling states associated with the potential (or candidate) scheduling states based on the membership values of the fuzzy sets and one or more rules. For example, the fuzzy inference modules 210 may determine an indicative value by using the membership values of the fuzzy sets as input values to one or more functions defined by the one or more rules. The indicative value may be associated with one or more candidate scheduling states. For example, each mobile unit 215 may be assigned to the DORMANT, ACTIVE, and/or NULL states.

Figure 3:
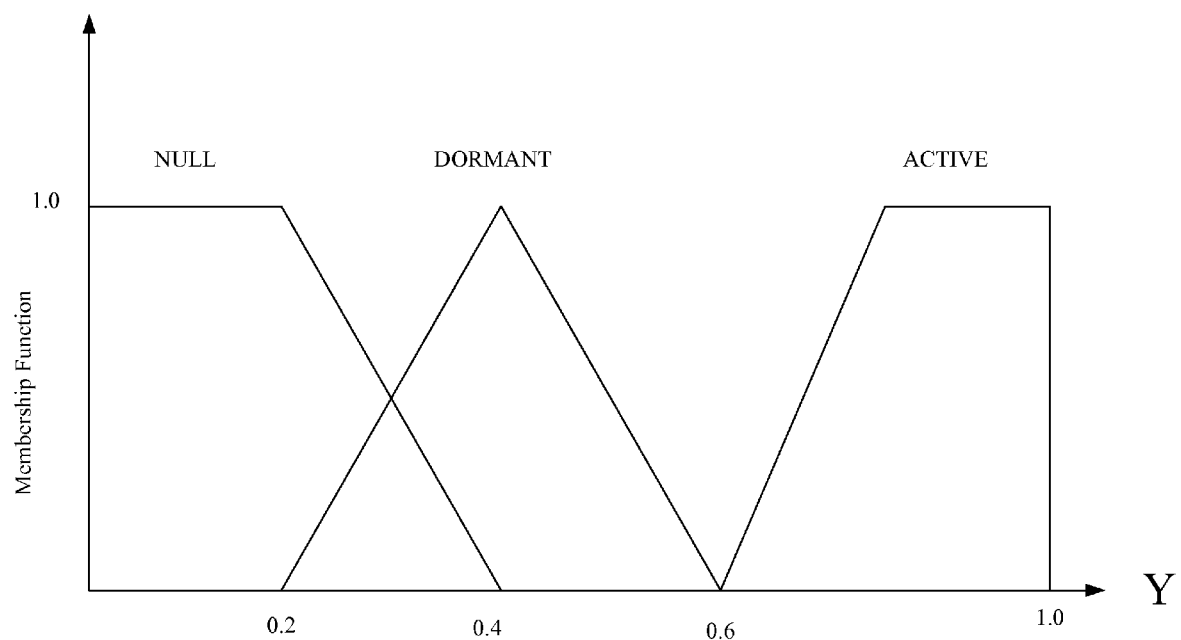
FIG. 3 conceptually illustrates one exemplary embodiment of a membership function, in accordance with the present invention.

FIG. 3 conceptually illustrates one exemplary embodiment of membership functions for the scheduling states. In the illustrated embodiment, the membership functions for states DORMANT, ACTIVE, and NULL are plotted as a function of an indicative value, Y. The vertical axis indicates values of the membership functions and the horizontal axis indicates values of the indicative value, Y. Units of the membership functions and the indicative value are arbitrary. Specifically, if the one or more rules provide an indicative value Y of 0.1 based on the input values of the radio resource parameters, then the output membership value of the NULL state is approximately 1.0 and the output membership value of the DORMANT and ACTIVE states are approximately 0. If the one or more rules provide an indicative value Y of 0.3 based on the input values of the radio resource parameters, then the output membership value of the NULL state and the DORMANT state are approximately 0.4 and the output membership value of the ACTIVE state is approximately 0. If the one or more rules provide an indicative value Y of 0.9 based on the input values of the radio resource parameters, then the output membership value of the NULL state and the DORMANT state are approximately 0.0 and the output membership value of the ACTIVE state is approximately 1.0. Persons of ordinary skill in the art having benefit of the present disclosure should appreciate that the membership functions shown in FIG. 3 are exemplary and not intended to limit the present invention.

Referring back to FIG. 2, the fuzzy inference modules 210 may associate the mobile units 215 with a state based upon one or more output membership values of the scheduling states. For example, if the output membership values associated with the ACTIVE, DORMANT, and NULL states are 0.8, 0.4, and 0.1, respectively, then the fuzzy inference modules 210 may associate the mobile units with the ACTIVE state since the membership value of ACTIVE state is the maximum. In the illustrated embodiment, the scheduling states associated with the mobile units 215 may indicate a priority level associated with the mobile units 215. For example, the ACTIVE state may indicate that the request from the mobile unit 215 has a high priority for receiving radio resources, the DORMANT state may indicate that the request from the mobile unit 215 has a medium level priority for receiving radio resources, and the NULL state may indicate that the request from the mobile unit 215 has a relatively low priority for receiving radio resources.

The fuzzy inference modules 210 may provide information indicative of the states assigned to the mobile units 215 to an allocation state module 225, which may be implemented in hardware, firmware, software, or any combination thereof. In the illustrated embodiment, the allocation state module 225 may associate an allocation state with the mobile units 215 based on the state assigned by the fuzzy inference modules 210. The allocation state module 225 also associates the allocation state with the mobile units 215 based upon the availability of radio resources, e.g., the maximum number of users that may be supported by the communication system. In one embodiment, the allocation state module 225 applies a priority-judging algorithm having one or more competition rounds to the states associated with the mobile units 215 and allocates the available radio resources based upon the relative priorities indicated by the states. For example, the allocation state module 225 may associate an allocation state $S_{allocation}$ to a portion of the ACTIVE mobile units 215, an allocation state $S_{waiting}$ to mobile units 215 that may not be scheduled in the current round of competition but that may be able to receive radio resources in the next round of competition, and an allocation state $S_{reject}$ to mobile units 215 that are currently rejected and are not likely to receive radio resources in the next competition round.

Once the allocation state module 225 has associated allocation states with the mobile units 215, the input states associated with the mobile units 215 may be modified and carried back to the input of the allocation state module 225 by a state transition module 230. The state transition module 230 may be implemented in hardware, firmware, software, or any combination thereof. The allocation state module 225 may then use the modified input states associated with the mobile units 215 to associate allocation states with the mobile units 215 in the next competition round.

Figure 4:
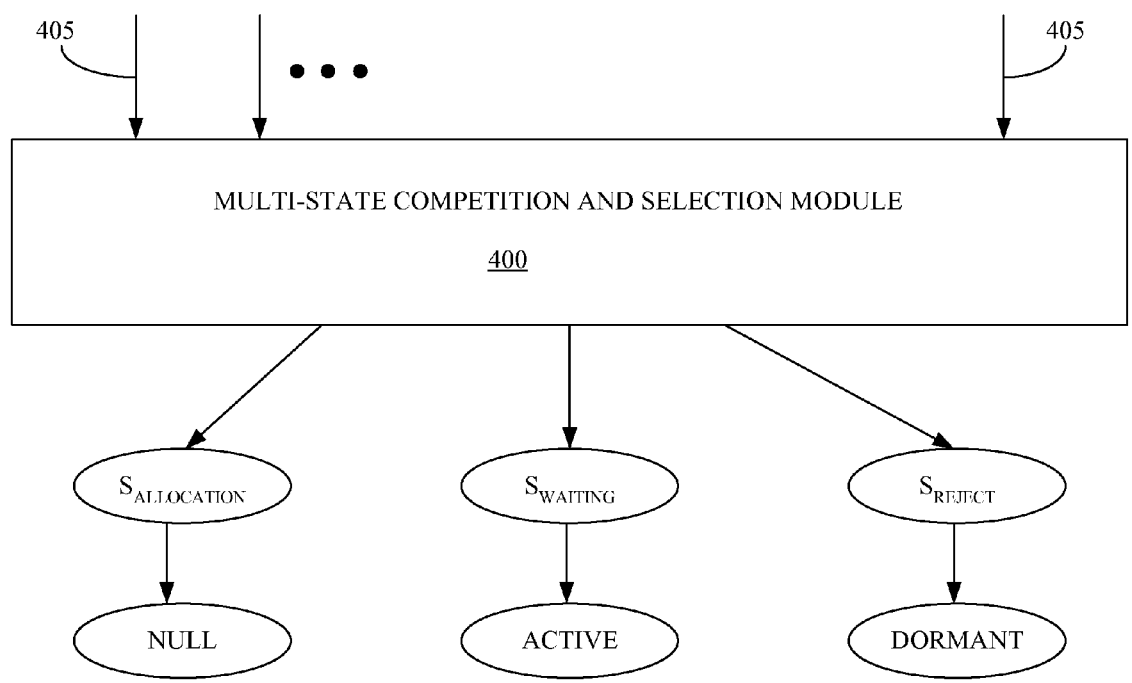
FIG. 4 conceptually illustrates one exemplary embodiment of a multi-state competition and selection module that may be used in the scheduling module shown in FIG. 2, in accordance with the present invention.

FIG. 4 conceptually illustrates one exemplary embodiment of a multi-state competition and selection module 400 that may be implemented as part of the allocation state module 225 in the scheduling module 200 shown in FIG. 2. In the illustrated embodiments, the multi-state competition and selection module 400 receives inputs indicative of the scheduling states associated with one or more mobile units, such as the mobile units 215 shown in FIG. 2, as indicated by the arrows 405. The multi-state competition and selection module 400 then assigns each of the mobile units to an allocation state, e.g., one of the allocation states $S_{allocation}$, $S_{waiting}$, and/or $S_{reject}$. Persons of ordinary skill in the art having benefit of the present disclosure should appreciate that these particular allocation states are exemplary and not intended to limit the present invention.

The fairness of the resource allocation scheme may be increased by modifying the scheduling states associated with the mobile units after the allocation states have been assigned. In the illustrated embodiment, the multi-state competition and selection module 400 may force the mobile units associated with the allocation state $S_{allocation}$ to transit to a lower priority level, e.g., the NULL state. The multi-state competition and selection module 400 may force the mobile units associated with the allocation state $S_{waiting}$ to transit to a higher priority level, e.g., the ACTIVE state, and may force the mobile units associated with the allocation state $S_{reject}$ to transit to a higher priority level, e.g., the DORMANT state.

Referring back to FIG. 2, the allocation state module 225 may provide information indicative of the allocation states to a resource allocation module 235. In the illustrated embodiment, the resource allocation module 235 allocates resources to mobile units based upon the allocation state provided by the allocation state module 225. For example, mobile units having an allocation state of $S_{allocation}$ may be allocated available resources such as transmission power, channel codes, time slots, modulation/coding sets, and the like. The mobile units may then use the allocated radio resources to transmit and/or receive information.

Figure 5:
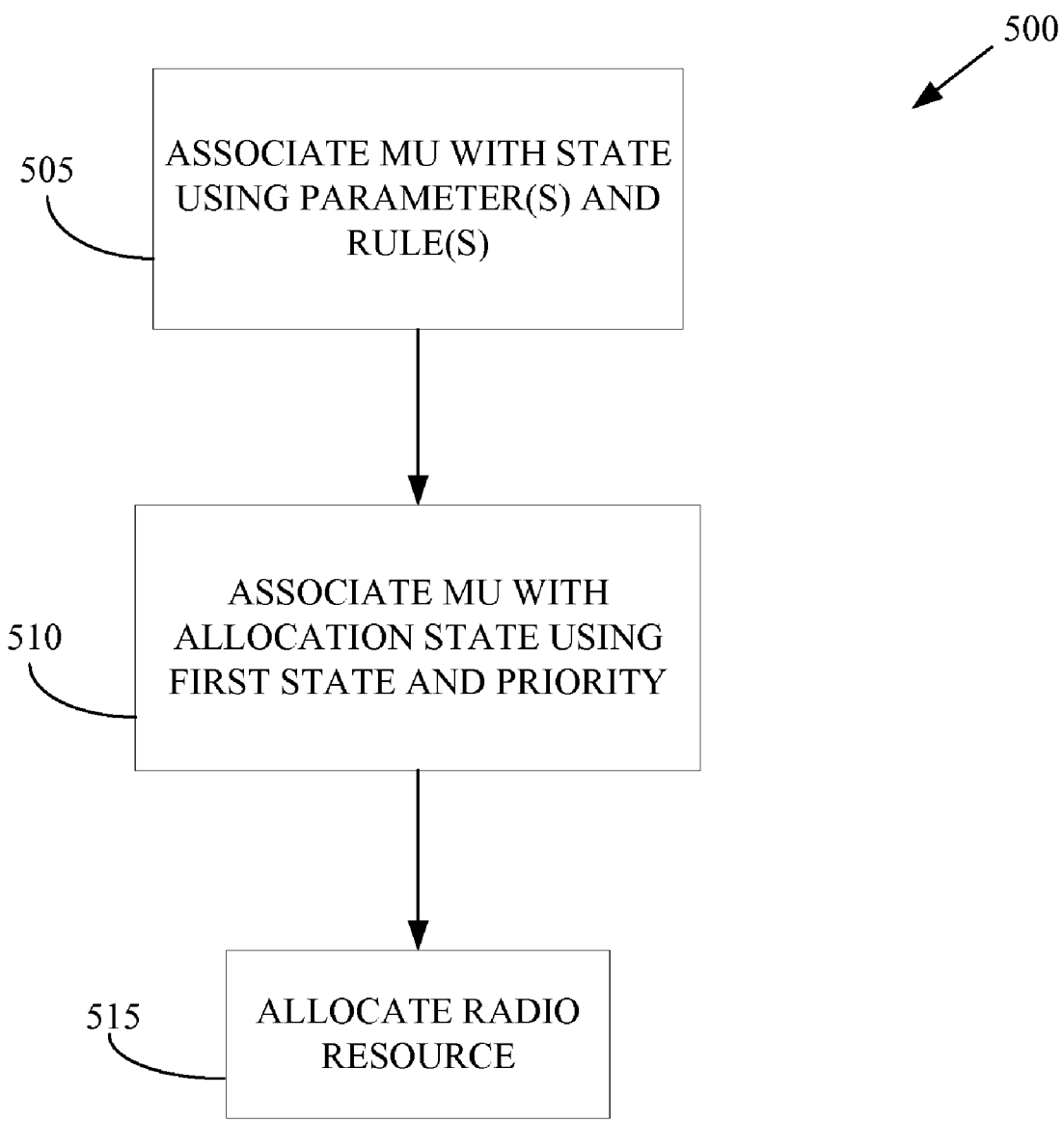
FIG. 5 conceptually illustrates one exemplary embodiment of a method of allocating radio resources, in accordance with the present invention.

FIG. 5 conceptually illustrates one exemplary embodiment of a method 500 of allocating radio resources. In the illustrated embodiment, mobile units may be associated (at 505) with a state indicative of a priority level using one or more radio resource parameters and one or more rules, such as fuzzy logic rules. The mobile units may then be associated (at 510) with an allocation state using the state indicative of the priority level of the mobile unit and the available radio resources. Radio resources may then be allocated (at 515) to one or more of the mobile units based upon the allocation state associated with each mobile unit.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    associating, using a scheduling module, each of a plurality of mobile units with one of a plurality of scheduling states based on at least one radio resource parameter and at least one fuzzy rule by associating the mobile units with at least one value of at least one variable based on said at least one fuzzy rule and said at least one radio resource parameter, determining at least one membership function associated with said at least one value of said at least one variable based on said at least one fuzzy rule and said at least one radio resource parameter, and determining at least one membership function associated with at least one candidate scheduling sate based on said at least one membership function associated with said at least one value of said at least one variable, and wherein east of the plurality of scheduling states indicates a different priority for scheduling;
    associating, using the scheduling module, each mobile unit with one of a plurality of allocation sates based on the scheduling states associated with the mobile units, each of the plurality of allocation states indicating a likelihood that a portion of at least one radio resource will be allocated to each mobile unit; and
    allocating, using the scheduling module, said at least one radio resource to at least one mobile unit based on the allocation states.

2. The method of claim 1, wherein associating each mobile unit with one of the plurality of scheduling states based on said at least one radio resource parameter comprises associating the mobile units with the scheduling states using at least one fuzzy rule that relates the plurality of scheduling states to at least one of a transmission power, a number of channel codes, a number of time slots, a modulation/coding set, and a quality of service parameter associated with each mobile unit.

3. The method of claim 2, wherein associating each mobile unit with one of the plurality of scheduling states using said at least one fuzzy rule that relates the plurality of scheduling states to at least one quality of service parameter associated with each mobile unit comprises associating each mobile unit with a scheduling state at least one of a traffic class, a peak transmission rate, a maximum latency, a maximum packet loss rate, a delay sensitivity, an end-to-end delay, an inter-user quality of service parameter, and an intra-user quality of service parameter.

4. The method of claim 1, wherein associating each mobile unit with one of the plurality of scheduling states comprises selecting the scheduling states from said at least one candidate scheduling state based on said at least one membership function associated with said at least one candidate scheduling state.

5. The method of claim 1, wherein associating the mobile units with one of the plurality allocation states comprises associating the mobile units with said at least one allocation state using a priority-judging algorithm.

6. The method of claim 5, wherein associating the mobile units with one of the plurality of allocation states comprises applying the priority-judging algorithm to the plurality of scheduling states associated with the mobile units.

7. The method of claim 1, wherein associating the mobile units with said one of the plurality allocation states comprises associating the mobile units with said at least one allocation state based on availability of said radio resource.

8. The method of claim 1, wherein allocating said at least one radio resource comprises allocating said at least one radio resource to at least one mobile unit associated with the allocation state the indicates the highest likelihood that said radio resource will be allocated to said at least one mobile unit.

9. The method of claim 1, comprising modifying the allocation state associated with the mobile units following allocation of said at least one radio resources to said at least one mobile unit.

10. The method of claim 9, wherein allocating said radio resource comprises allocating said radio resource to at least one mobile unit when the modified value of the allocation state associated with the mobile unit indicates the highest likelihood that said at least one radio resource will be allocated to said at least one mobile unit.

11. The method of claim 9, wherein modifying the allocation state associated with the mobile units comprises changing the allocation state associated with mobile units that were not allocated said at least one radio resource to an allocation state that indicates a higher likelihood that said at least one radio resource will be allocated to the mobile unit.

12. The method of claim 9, wherein modifying the allocation state associated with the mobile units comprises changing the allocation state associated with mobile units that were allocated said at least one radio resource to an allocation state that indicates the lowest likelihood that said at least one radio resource will be allocated to the mobile unit.

13. The method of claim 1, wherein associating each of the plurality of mobile units with one of a plurality of scheduling states comprises associating each of the plurality of mobile units with at least one of an active state, a dormant state, or a null state.

14. The method of claim 1, wherein associating each of the plurality of mobile units with one of a plurality of allocation states comprises associating each of the plurality of mobile units with at least one of an allocation state, a waiting state; and a reject state.

* * * * *